United States Patent [19]

Santos-Gomez

[11] Patent Number: 5,920,315

[45] Date of Patent: *Jul. 6, 1999

[54] MULTI-PANE WINDOW WITH RECOILING WORKSPACES

[75] Inventor: Lucinio Santos-Gomez, Durham, N.C.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/685,899

[22] Filed: Jul. 17, 1996

[51] Int. Cl.$^6$ ........................................... G06F 3/00
[52] U.S. Cl. ............................ 345/342; 345/346; 345/356
[58] Field of Search .................................... 395/333, 334, 395/339, 340, 342, 343, 348, 346, 356, 345; 345/119, 345, 333, 334, 339, 340, 342, 348, 346, 356

[56] References Cited

U.S. PATENT DOCUMENTS

| | | | |
|---|---|---|---|
| 4,975,690 | 12/1990 | Toppes ...................................... | 345/119 |
| 5,072,412 | 12/1991 | Henderson, Jr.et al. ................. | 395/159 |
| 5,233,687 | 8/1993 | Henderson, Jr. et al. ............... | 395/158 |
| 5,289,574 | 2/1994 | Sawyer ..................................... | 395/157 |
| 5,371,847 | 12/1994 | Hargrov ................................... | 395/342 |
| 5,390,295 | 2/1995 | Pates et al. .............................. | 395/342 |
| 5,394,521 | 2/1995 | Henderson, Jr. et al. ............... | 395/158 |
| 5,561,757 | 10/1996 | Southgate ................................ | 395/342 |
| 5,572,649 | 11/1996 | Elliot et al. .............................. | 395/342 |
| 5,577,187 | 11/1996 | Mariani ................................... | 395/342 |
| 5,583,984 | 12/1996 | Conrad et al. .......................... | 395/340 |
| 5,712,995 | 1/1998 | Cohn ........................................ | 345/342 |

FOREIGN PATENT DOCUMENTS

| | | | |
|---|---|---|---|
| 0572205 | 12/1993 | European Pat. Off. ........ | G06F 3/033 |
| 9424657 | 10/1994 | WIPO .............................. | G09G 1/06 |

OTHER PUBLICATIONS

"Automatic Tiling of Arbitrary Objects", Research Disclosure, No. 344, Dec. 1, 1992, p. 943.

*Primary Examiner*—Raymond J. Bayerl
*Assistant Examiner*—Cao H. Nguyen
*Attorney, Agent, or Firm*—Jeanine S. Ray-Yarletts

[57] ABSTRACT

Methods, data processing systems or program products which provide user interfaces including a window having a workspace and a first set of non-overlapping resizeable panes comprising a plurality of non-overlapping resizeable panes within the workspace. The non-overlapping resizeable panes occupy substantially the entirety of said workspace. Open or closing pane creates a second set of panes in the window. In the opening case, the second set of panes include the first set of panes and a new pane in non-overlapping relationship without requiring resizing of the new pane or the first set of panes by the user. In the closing case, the second set of panes include the remaining panes of the first set of panes which occupy substantially the entirety of the workspace in non-overlapping relationship without requiring resizing of the new pane or the first set of panes by the user. Selectable contents may also be provided and are contained within at least one of the non-overlapping resizeable panes which includes at least one option icon of user selectable options. Selecting an option icon causes the contents of the non-overlapping resizeable pane to be replaced by contents associated with the selected option icon.

15 Claims, 8 Drawing Sheets

MULTI-PANE WINDOW WITH RECOILING WORKSPACES

FIELD OF THE INVENTION

The present invention relates generally to user interfaces for computer systems. More particularly, the present invention relates to multiple workspaces in a user interface environment for a computer system.

BACKGROUND OF THE INVENTION

Increases in processing capability and decreases in the cost of personal computers has led to the proliferation of personal computers in all aspects of society. Personal computers are utilized in schools, homes and in business. Furthermore, with the decreased costs of personal computers, it has become more feasible from a cost perspective to use computers for tasks, and to carry out functions, which were previously done without the use of computers.

With the proliferation of computers throughout numerous aspects of life has come a trend to graphic user interfaces which make using a computer more intuitive. Examples of such graphic user interfaces include IBM® OS/2®, Apple® System 7®, and Microsoft® Windows®. These operating systems all rely on a "window like" workspace for applications, operating system information, such as directory information, and program groupings. Multiple windows may be displayed on the screen of a computer display device simultaneously in what is often referred to as a "desktop." Windows within a desktop are defined by a border which surrounds the window and may also include a title bar and in some cases a series of menu choices which may manage the appearance and contents of the window. In combination with a pointing device, windows may be independently moved and resized by "dragging" a border to a new location. Resizing a window may also be accomplished by dragging the corner of a window which simultaneously resizes the window in two directions.

Multiple windows on a desktop may be displayed in two primary ways. Windows may overlap each other and obscure windows beneath the topmost window in what is often referred to as a "cascade" or windows may be "tiled" across the screen so that the windows do not overlap. However, the tile method of displaying windows has previously been utilized primarily as a user selected option after creation of cascaded overlapping windows, in for example, Windows® and Windows® applications such as WordPerfect® for Windows®. In either the cascade case or the tile case, the creation or destruction of windows does not affect the sizing of existing windows on the screen. Furthermore, windows may be independently moved about the screen to relocate the window on the desktop.

To the best of the inventor's present knowledge, present user interfaces only allow independently sized and positioned windows or windows which bear a fixed relationship between each other. Thus, as a user opens new windows the older windows may be overlapped and obscured. When the user resizes one window the remaining windows open on the desktop are not resized and the user may resize each window individually to correct for overlap of multiple windows that the user desires to be visible.

Alternatively, to the best of the inventor's present knowledge, as a user opens an application, such as Windows® Explorer, which has a fixed number of resizeable subdivisions in the application window, the size of each subdivision is specified by the application. Furthermore, the number of subdivisions of the window is constant in that, for example, only two subdivisions of the window are present. Finally, these subdivisions are permanently connected so that they are in a fixed relationship with each other. Thus, a degree of flexibility of the user interface is sacrificed when the application has resizeable subdivisions of its window.

As a result of the increased complexity and the multi-tasking or multi-thread capabilities of modern graphic interface operating systems such as OS/2®, it has become more and more likely that multiple windows will be open on the desktop simultaneously. With ever increasing size and resolution capabilities of display devices for computers it becomes more likely that a meaningful presentation of multiple windows is possible. Also, window based operating systems such as Windows® 95 and Apple System 7® display disk information within windows. Thus, to navigate a directory structure to locate a desired file a window is opened for each directory in the path to the file. These windows provide useful information only for a short period of time until the next level in the path is opened but remain displayed on the screen until closed by the user. Thus, often the screen becomes quickly cluttered with windows which contain information which is no longer needed.

As these examples illustrate, as the number of windows on a desktop increases there is an increased likelihood that a window containing information the user desires to be displayed is obscured. Thus, the increase in the use of multiple window applications and windowing operating systems has resulted in the proliferation of windows on a user's desktop which often clutters and obscures the useful information the user desires.

When these limitations of user interfaces are combined with the proliferation of windows on a desktop, the user is often required to resize each window individually to correct for overlap of multiple windows that the user desires to be visible or to perpetually close unneeded windows. Accordingly, in view of the above, it is apparent that the increase in use of graphical user interfaces and the increased capabilities of computers has brought about a need for improvements in the manipulation of windows in these user environments.

OBJECTS AND SUMMARY OF THE INVENTION

In view of the above limitations of existing user interfaces, it is an object of the present invention to provide user interfaces which increase the flexibility of manipulation of windows in a user interface.

It is a further object of the present invention to provide user interfaces that reduce the amount of manipulation of workspaces required to resize multiple workspaces in a user interface.

Yet another object of the present invention is to provide user interfaces which reduce the amount of overlapping of workspaces and increase the ease with which overlapping of workspaces may be remedied to provide multiple simultaneously useable workspaces in a user interface.

Another object of the present invention is to reduce window proliferation in a user interface.

A further object of the present invention is to avoid desktop clutter.

Yet another object of the present invention is to make readily accessible to a user the more relevant information while reducing the prominence of less relevant information.

These and other objects of the present invention are provided by methods, data processing systems or program products which provide user interfaces for a data processing system. The user interfaces include a window having a workspace and a first set of non-overlapping resizeable panes comprising a plurality of non-overlapping resizeable panes within the workspace. The non-overlapping resizeable panes occupy substantially the entirety of said workspace. Also included are means, responsive to a user input to open a new pane, for creating a second set of panes in the window. The second set of panes include the first set of panes and a new pane in non-overlapping relationship without requiring resizing of the new pane or the first set of panes by the user.

In a further embodiment of the present invention, a user interface is provided with means responsive to a user input to close a selected one of the first set of panes. A third set of panes is created which includes the non-selected panes of the first set of panes in non-overlapping relationship without requiring resizing of the non-selected panes of the first set of panes by the user. This third set of panes occupies substantially the entirety of the workspace.

Thus a user can create/expose a pane or workspace without overlapping existing panes and without requiring input from the user to resize the existing panes. Furthermore, the user may close or hide panes or workspaces while still utilizing substantially all of the available workspace. This automatic resizing of panes reduces the amount of user input required to manage the presentation of information in the user interface and, thus, can reduce the clutter of the user interface.

In another aspect of the present invention, user interfaces include means for creating a second window having a workspace. Also included are means for selecting one of the plurality of non-overlapping resizeable panes and for placing the contents which correspond to the selected one of the plurality of non-overlapping resizeable panes in the second window.

In yet another aspect of the present invention, user interfaces include means associated with a plurality of non-overlapping resizeable panes for selecting one of the plurality of non-overlapping resizeable panes and means for dragging the selected one of the plurality of non-overlapping resizeable panes to outside the first window. Finally, the user interface includes means for creating a second window having a workspace the contents of which correspond to the selected and dragged one of the plurality of non-overlapping resizeable panes.

The ability to create a new window separate from the commonly resized panes but containing the contents of a pane, either by dragging and dropping a pane or otherwise, provides the user with the flexibility to maintain fixed size for a workspace without losing the benefits of the commonly sized panes. Thus, a user has available at their discretion the benefits of overlapping windows for some information and for commonly sized windows for other information. This flexibility allows the user to tailor the user interface to their specific needs while still reducing desktop clutter and reducing the likelihood that information will be obscured by window proliferation.

In another embodiment of the present invention, resizing of one of the plurality of resizeable panes causes resizing of other of the resizeable panes.

In still another embodiment of the present invention, user interfaces for a data processing system are provided which include a window having a workspace and a plurality of non-overlapping resizeable panes within the workspace of the window. Selectable contents are provided and are contained within at least one of the non-overlapping resizeable panes which includes at least one option icon of user selectable options. Selecting an option icon causes the contents of the non-overlapping resizeable pane to be replaced by contents associated with the selected option icon.

In a further embodiment of the present invention, the user interface includes a view stack associated with one of the non-overlapping resizeable panes the contents of which has been replaced. The view stack has a view icon associated with the replaced contents of the associated non-overlapping resizeable pane such that selection of the view icon causes the contents of the associated non-overlapping resizeable pane to be replaced by the contents associated with the selected view icon.

By replacing the contents of a pane with the contents associated with the selected icon, the proliferation of windows may be reduced. A user will not be presented with an ever increasing number of windows of old and less relevant information but will have the most relevant information displayed most prominently in the workspace. Furthermore, with the inclusion of a view stack the user may readily move between contents of a pane to access the underlying information. These aspects of the present invention may substantially reduce window proliferation and allow a user to focus on the most relevant information without rearranging a desktop and without having to close out of date windows.

In another embodiment of the present inventions, the plurality of resizeable panes contain related information. Selection of the selectable contents of one of the plurality of resizeable panes causes contents of one other of the plurality of resizeable panes to be revised.

As will be appreciated by those of skill in this art, the above described aspects of the present invention may also be provided as method, data processing systems or computer program products.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or: magnetic storage devices.

Figure 1:
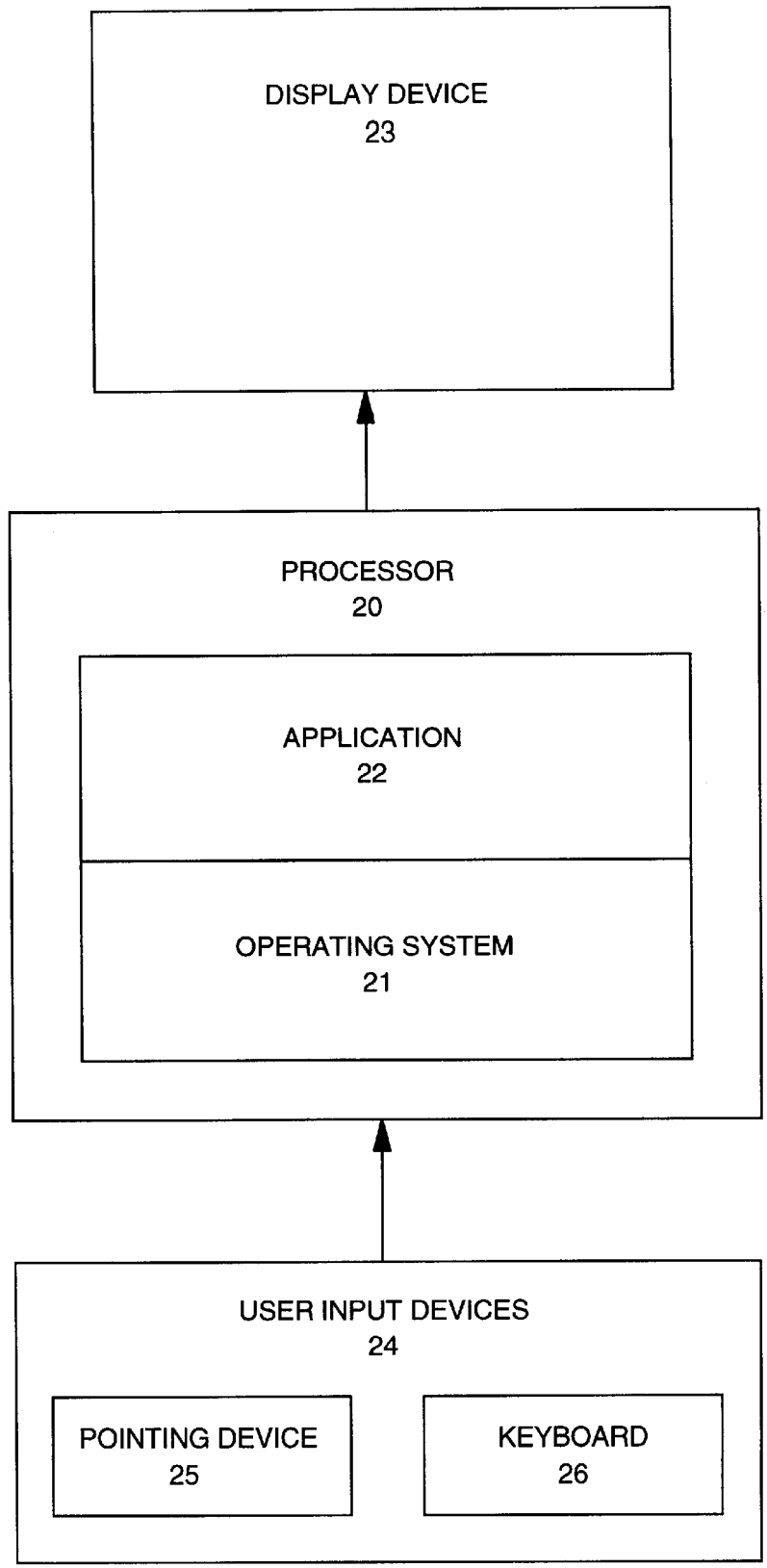
FIG. 1 is a logical diagram of a system utilizing the present invention.

FIG. 1 illustrates a data processing system on which user interfaces according to the present invention may be utilized. As seen in FIG. 1, a data processor 20 may have an operating system 21 resident in the processor 20. An application 22 may be running on the operating system 21. The processor 20 displays information on a display device 23. The display device 23 has a plurality of picture elements (collectively referred to as a screen) which may define the appearance of a user interface environment displayed on the display device 23. The contents of the screen of the display device 23 and, therefore, the appearance of the user interface environment, may be controlled or altered by the application 22 or the operating system 21 either individually or in combination.

For obtaining input from a user, the operating system 21, the application 22 or both may utilize user input devices 24. User input devices 24 may include a pointing device 25 and a keyboard 26 or other input devices known to those of skill in the art. User input devices 24 may be used to designate areas of the screen or locations on the screen such as the border of a workspace or the corner of the borders of the workspace. Furthermore, once designated, the user interface may display a separate icon to indicate that selection of that location of the screen may translate the feature of the workspace or the workspace itself to a different location on the screen.

Figure 2:
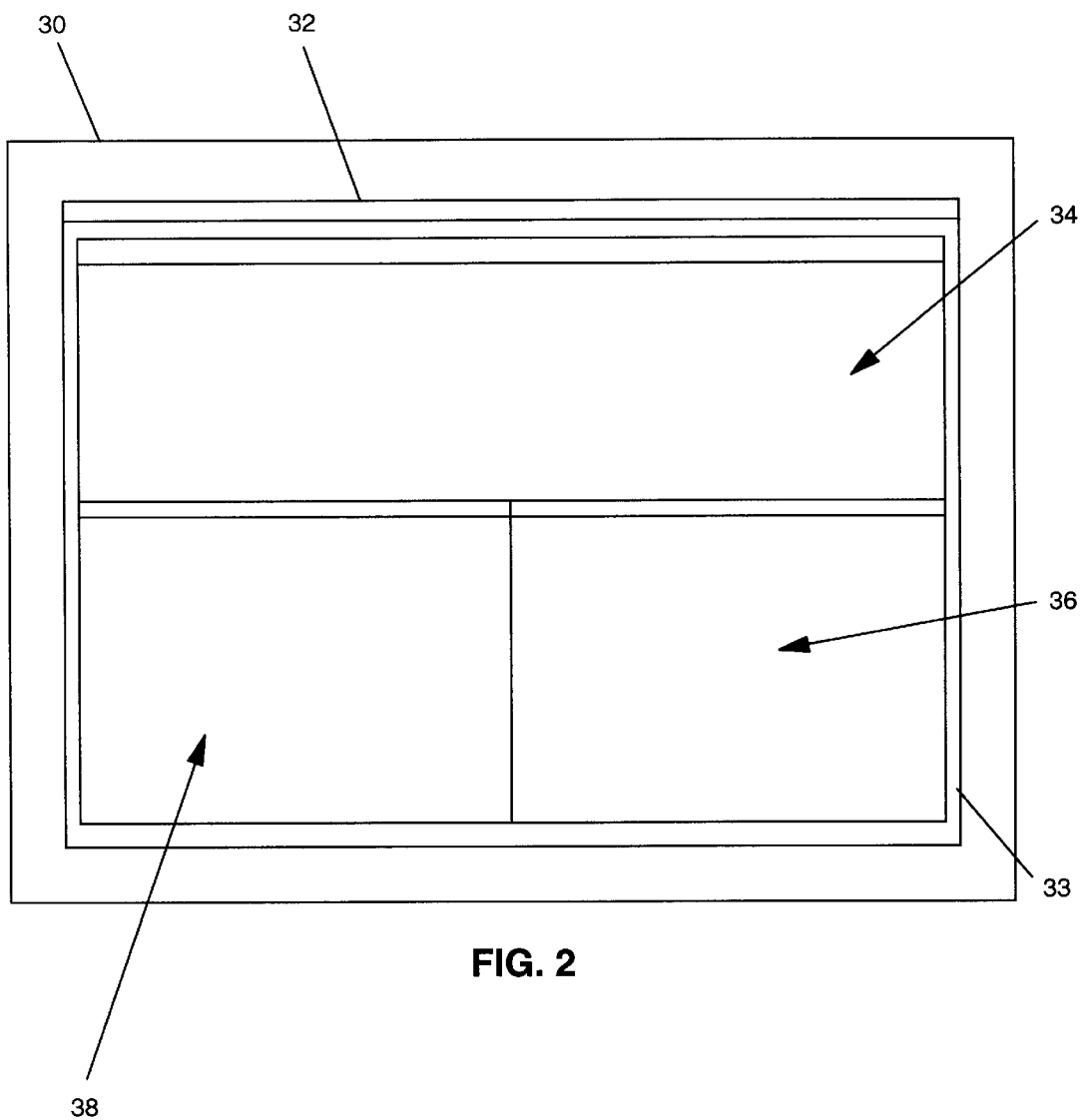
FIG. 2 is a diagram of a screen utilizing the present invention having three panes.
Figure 3:
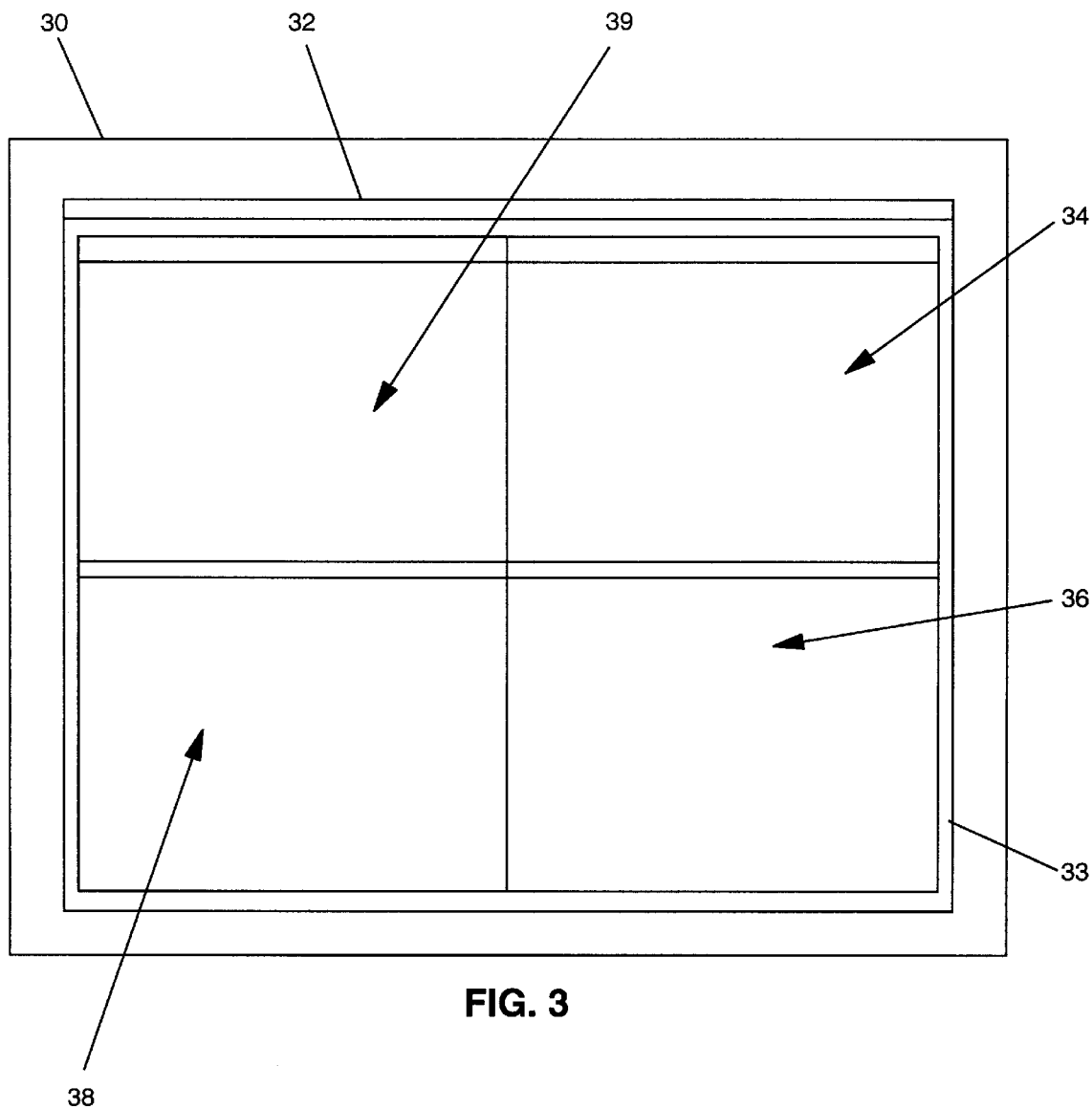
FIG. 3 is a diagram of the screen of FIG. 2 with an additional pane opened by user input.

FIGS. 2 and 3 illustrate one embodiment of the present invention which utilizes automatically resized panes. As seen in FIG. 2 a screen 30, which may be displayed on display device 23, has a window 32 having a workspace 33. FIG. 2 illustrates a first set of non-overlapping resizeable panes 34, 36 and 38. This plurality of non-overlapping resizeable panes is contained within the workspace 33 of window 32 and occupy substantially the entirety of the workspace.

User input received from user input devices 24, may create or open a new pane, uncover or expose a minimized or existing pane or close or hide an existing pane. FIG. 3 illustrates the creation of a new pane. As discussed below, this operation on a pane may be accomplished by a single user input of a check box or other fast path to manipulation of a pane within a window. As seen in FIG. 3, user input has instructed the processor 20 to open a new pane. Thus a second set of panes 34, 36, 38 and 39 in window 32 is created. This second set of panes includes the first set of panes 34, 36 and 38 and the new pane 39 in non-overlapping relationship with each other and without requiring resizing of the new pane 39 or the first set of panes 34, 36, and 38 by the user.

The reverse operation of closing a pane within the workspace 33 may also be carried out based on user input. In the reverse case, user input from the user input devices 24 selects one of a set of panes. The selected pane is closed and a set of panes comprising the non-selected panes is created. This new set of panes is created such that the remaining panes are in non-overlapping relationship without requiring resizing by the user. The resized non-selected panes occupy substantially the entirety of the workspace 33. Thus, if the first set of panes is illustrated in FIG. 3, FIG. 2 may illustrate the resized panes after one of the panes of FIG. 3 is closed.

Figure 4:
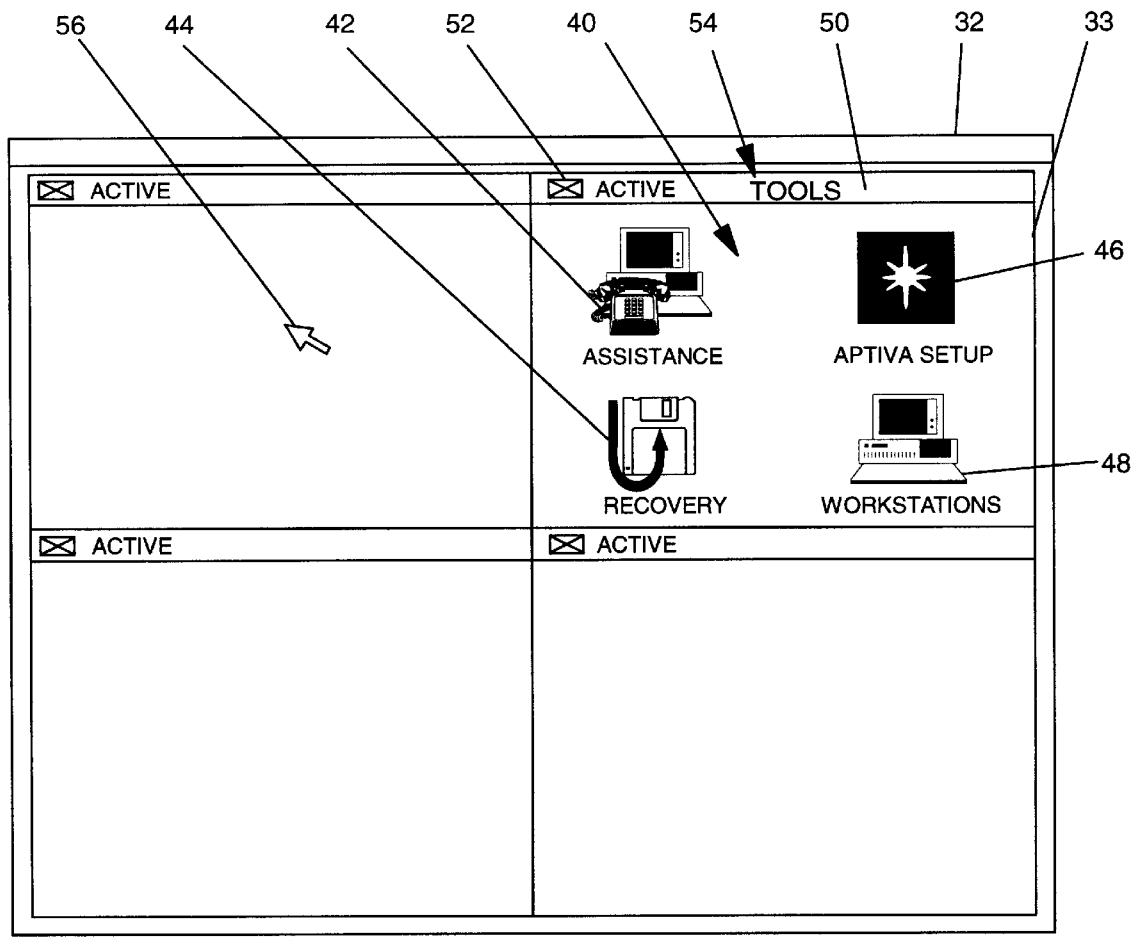
FIG. 4 is a diagram of a screen according to the present invention having icons for user selection.
Figure 5:
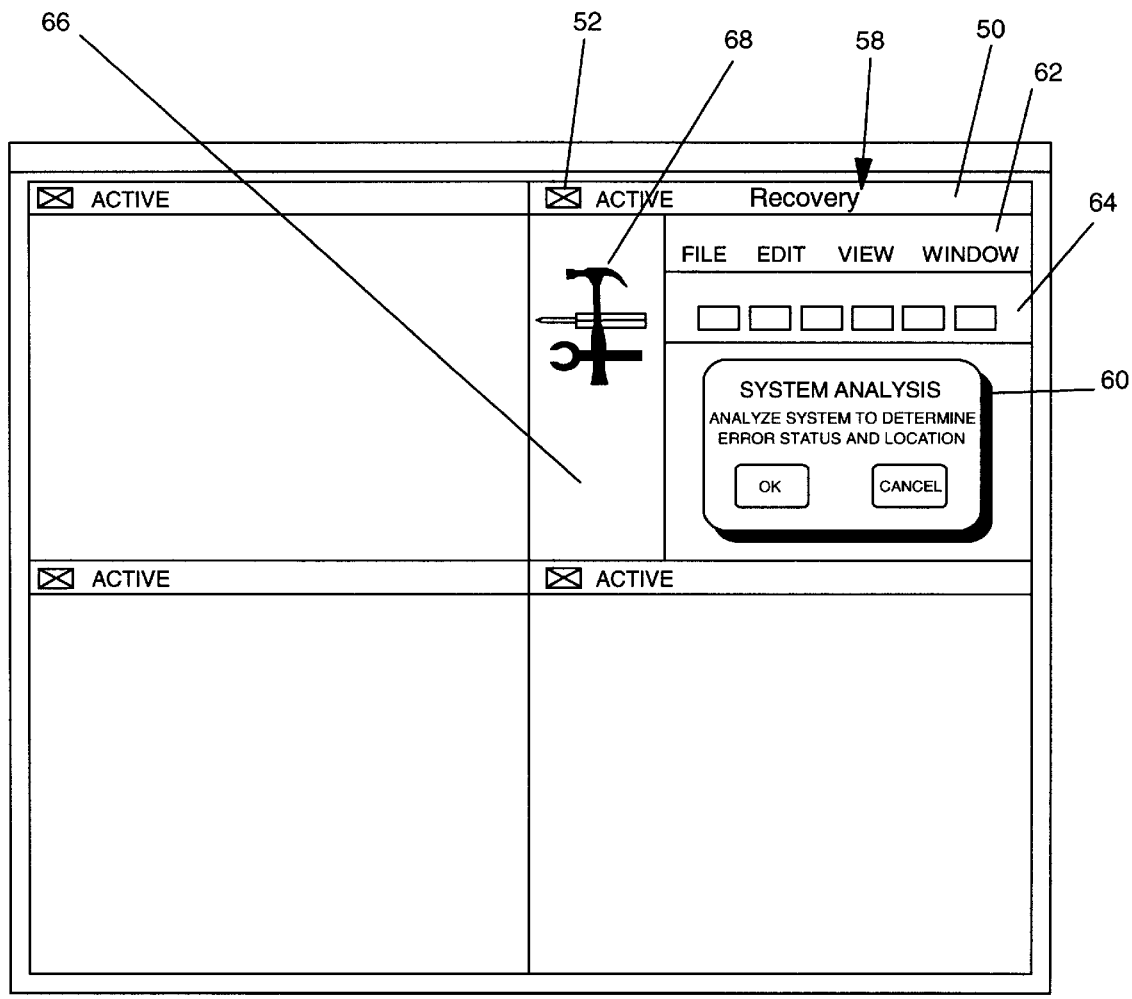
FIG. 5 is a diagram of the window of FIG. 4 after selection of a user selectable option icon.

Another aspect of the present invention is illustrated in FIGS. 4 and 5. FIG. 4 and FIG. 5 illustrate windows within a screen. As seen in FIG. 4, a plurality of icons are provided as contents of a pane. Pane 40 contained within the workspace 33 of window 32 has four icons 42, 44, 46 and 48. These icons may represent any number of user selectable options, such as, for example, applications, directories, folders or files in a directory structure. As will be appreciated by those of skill in the art, while the present invention is described with respect to icons in a graphical user interface, any number of methods of identifying user selectable options may be employed while still benefitting from the teachings of the present invention. The icons 42, 44, 46 and 48 are contained within pane 40 which also has a title bar 50 with a title 54 which may be utilized to identify the grouping of icons. The pane 40 may also have means for deactivating, hiding or closing the pane such as is illustrated by the check box 52. Check box 52 allows for a single user input to manipulate the visibility of the pane through either hiding or closing the pane.

By selection of a user selectable option, such as with pointing device icon 56, the user activates a user selectable option which replaces the contents of a pane, such as pane 40, with contents based upon the user selected option. Accordingly, as illustrated in FIG. 5, selection of the "Recovery" icon 44 has replaced the contents of pane 40 with the Recovery application user interface. As seen in FIG. 5, the title bar 50 of pane 40 now has a title 58 which indicates the "Recovery" application occupies pane 40. Also, the menu bar 62 and a button bar 64 have been included in pane 40 as part of the "Recovery" user interface. Finally, a dialogue box 60 for the "Recovery" application is illustrated in pane 40 to indicate that the contents of pane 40 is now controlled by the "Recovery" application.

In addition to replacing the contents of pane 40 with the recovery application, FIG. 5 illustrates the creation of a view stack 66 which contains a view icon 68. The view stack 66 indicates the contents of pane 40 which have been replaced by selection of a user selectable option. The view icon 68 is associated with the replaced contents such that selection of the view icon 68 would cause the contents of pane 40 to revert to the "Tools" view of FIG. 4. As will be appreciated by those of skill in the art, the view stack 66 may contain icons or any other type of indicia from which a user may select previous contents of a pane. Furthermore, any number of previous panes may be reflected in the view stack such that a plurality of icons may be contained in the stack with each icon associated with previous contents of the pane. Optionally, deactivation of a pane by the user selectable check box 52 or its equivalent may remove from the view stack any icon associated with the deactivated contents of the pane. Thus, selection of a user selectable option provides the desired results of that selection to the user without a proliferation of windows. Furthermore, any contents in the path to the topmost contents of the pane are also available to the user in a single operation and may be selectively removed from the stack of views to further reduce the complication and clutter of the interface.

Figure 6:
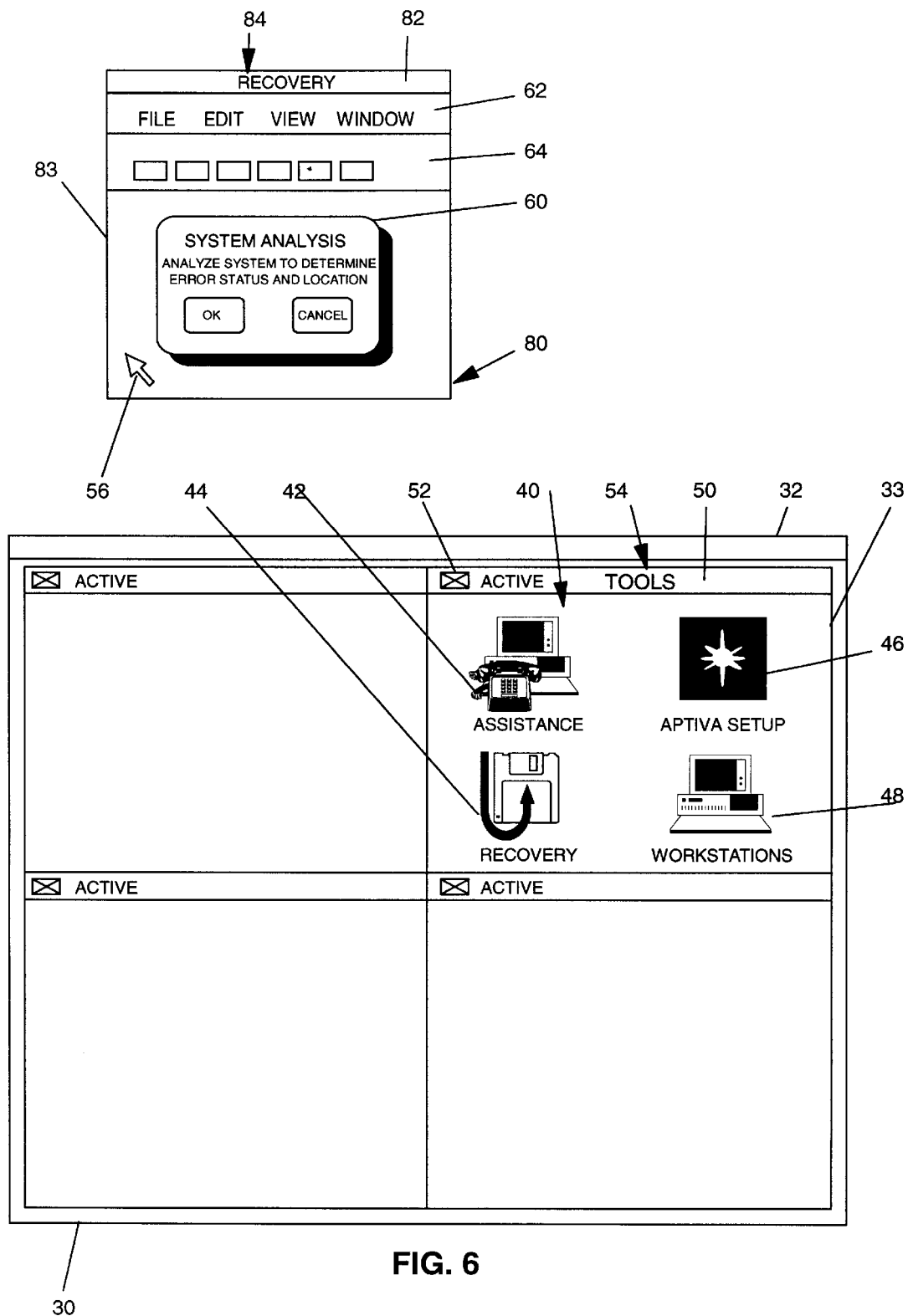
FIG. 6 is a diagram of screen of FIG. 5 after a pane is dragged to a new window.

FIG. 6 illustrates a further embodiment of the present invention. As seen in FIG. 6, the contents of pane 40 from FIG. 5 have been removed from window 30 and a new window 80 has been created with the workspace 83 of window 80 containing the contents of pane 40 from FIG. 5. Thus, the new window 80 has a title bar 82 with a title 84 indicating that the "Recovery" application controls the contents of the workspace 83 of window 80. Furthermore, the menu bar 62, button bar 64 and dialogue box 66 are now removed from pane 40 and reside in window 80. Also, pane 40 has reverted to the underlying contents of FIG. 4. Optionally, transfer of the contents of a pane to a new, stand-alone, window may simply close the pane in the original window. Furthermore, if there are no underlying contents of the pane, the pane could also close when the contents are transferred to a new window. Thus, the user may simultaneously display the contents of multiple windows selectively without the proliferation of every window in the path to the desired contents.

New window 80 may be created by selecting the contents of pane 40 by user input, such as with a pointing device, and then "dragging" the contents of pane 40 to outside window 32 on screen 30. This operation creates a new window in a single user operation. As will be appreciated by those of skill in the art, any number of methods of selecting a pane and creating a new window with the contents of the selected pane may be utilized, including, for example, keyboard input, pointing device input or a combination of the two input methods.

In a further aspect of the present invention, the contents of the panes of a window contain related information or related user selectable options. Accordingly, selection of a user selectable option in one pane may cause the contents of a related pane to also change. Furthermore, it is desirable that the panes within a window be resizeable with minimal user input. Accordingly, methods such as those described in the present inventor's commonly assigned, copending United States Patent Application entitled Multi-size Control for Multiple Workspaces, the disclosure of which is incorporated herein by reference as if set forth fully, may be utilized. Utilizing such methods, the resizing of one pane causes the automatic resizing of other panes within the window so as to maintain their non-overlapping relationship.

Figure 7:
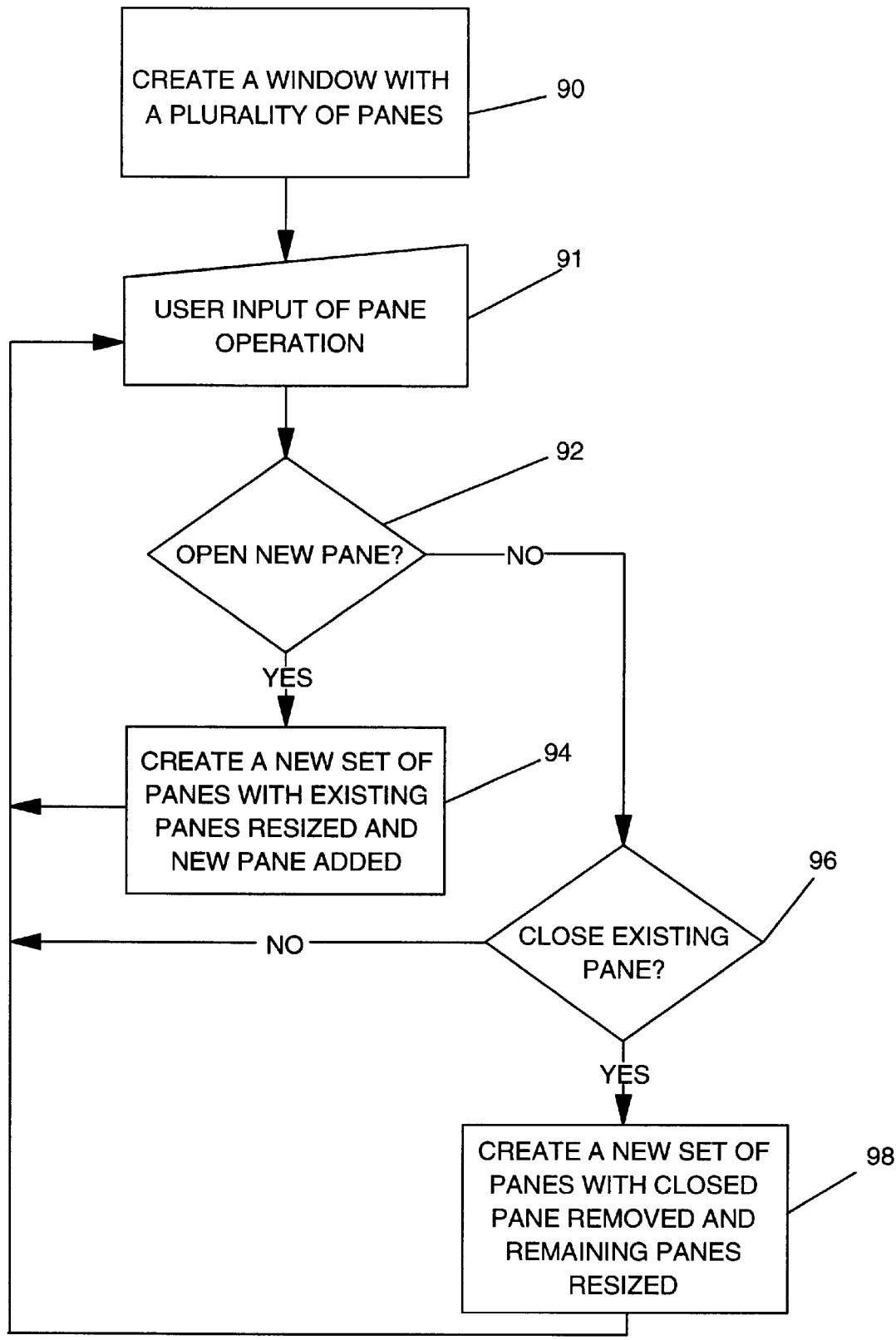
FIG. 7 is a flowchart of one embodiment of the present invention.
Figure 8:
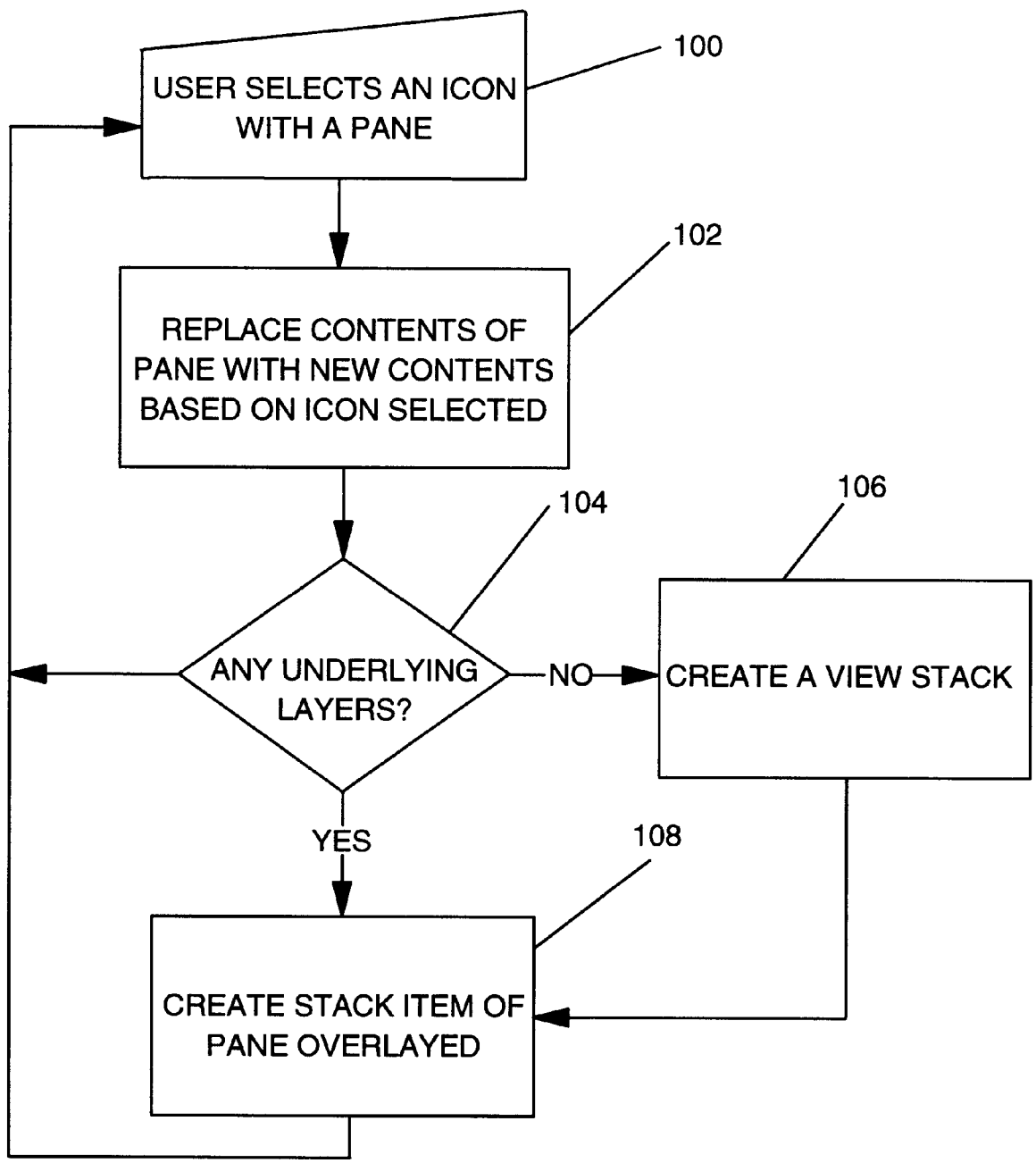
FIG. 8 is a flowchart of another embodiment of the present invention.

FIGS. 7 and 8 are flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

As seen in FIG. 7, a window is created with a plurality of panes 90. User input is then received as reflected in block 91. If the user input specified opening a new pane, then as seen in blocks 92 and 94, a new set of panes is created incorporating the new pane and resizing the existing panes. If the user input specifies the closing or deactivation of a pane, then, as seen in blocks 96 and 98, a new set of panes is created removing the pane to be closed and with the remaining panes resized to occupy substantially all of the workspace of the created window.

FIG. 8 illustrates the selection of a user selectable option by user input. When the user selects an icon, as reflected in block 100, the contents of the pane containing that icon are replaced with the contents associated with that icon. This operation is reflected in block 102. If there are no underlying layers for the pane, then a view stack does not exist for the pane and one is created, as reflected in blocks 104 and 106. A stack item or view icon is then created and added to the view stack as seen in block 108.

As used herein, the terms "open" and "close" when used with regard to a pane within a window refer to operations to make the contents of a pane visible or to hide the contents of a pane. Accordingly, any method known to those of skill in the art to hide a pane, such as minimizing, iconizing or closing a pane may be utilized. Furthermore, any method known to those of skill in the art of making a pane visible, such as creating a pane, opening a pane, or expanding from an iconized or minimized pane may be utilized in practicing the present invention.

As will be appreciated by those of skill in this art, the preceding examples are provided, not to limit or define the scope of the present invention, but to illustrate the nature of the present invention and possible uses for the teachings of the present invention. These examples may be modified in many different ways while still obtaining the benefits of the teachings of the present invention.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A user interface for a data processing system, the user interface comprising:

a window having a workspace;

a plurality of non-overlapping resizeable panes within said workspace of said window;

selectable contents contained within at least one of said non-overlapping resizeable panes wherein said selectable contents include at least one option icon of user selectable options and wherein selecting said at least one option icon causes contents of said at least one of said non-overlapping resizeable panes to be replaced by contents associated with said selected option icon and a view stack associated with said at least one of said non-overlapping resizeable panes the contents of which has been replaced, said view stack comprising a viewable display of one or more view icons, wherein:

each of said view icons is associated with a previously replaced contents of said associated non-overlapping resizeable pane;

said viewable display is a visual representation of a stack such that an earlier-replaced content visually appears below a later-replaced content; and selection of any of said view icons in a path to a top of said stack causes the contents of said associated non-overlapping resizeable pane to be replaced by the previously replaced contents associated with said selected view icon in a single operation.

2. The user interface according to claim 1, wherein said window comprises a first window, said user interface further comprising:

means for creating a second window having a workspace;

means responsive to user input for selecting one of said plurality of non-overlapping resizeable panes; and means responsive to said means for creating a second window and said means for selecting for placing the contents which correspond to said selected one of said plurality of non-overlapping resizeable panes is said second window.

3. The user interface according to claim 1, wherein said window comprises a first window, said user interface further comprising:

means associated with said plurality of non-overlapping resizeable panes for selecting one of said plurality of non-overlapping resizeable panes;

means associated with said selecting means for dragging said selected one of said plurality of non-overlapping resizeable panes to outside said first window; and means associated with said means for selecting and said means for dragging for creating a second window having a workspace the contents of which correspond to said selected and dragged one of said plurality of non-overlapping resizeable panes.

4. The user interface according to claim 1, wherein said plurality of resizeable panes contain related information and wherein selection of the selectable contents of said at least one of said plurality of resizeable panes causes contents of one other of said plurality of resizeable panes to be revised.

5. The user interface according to claim 1, wherein resizing of one of said plurality of resizeable panes causes resizing of other of said resizeable panes.

6. A computer program product for providing a user interface for a data processing system, the computer program product comprising:

a computer-readable storage medium having computer-readable program code means embodied in said medium, said computer-readable program code means comprising:

computer-readable program code means for providing a window having a workspace;

computer-readable program code means for providing a plurality of non-overlapping resizeable panes within said workspace of said window;

computer-readable program code means for providing selectable contents contained within at least one of said non-overlapping resizeable panes wherein said selectable contents include at least one option icon of user selectable options and wherein selecting said at least one option icon causes contents of said at least one of said non-overlapping resizeable panes to be replaced by contents associated with said selected option icon; and computer-readable program code means for providing a view stack associated with one of said non-overlapping resizeable panes the contents of which has been replaced, said view stack comprising a viewable display of one or more view icons, wherein:

each of said view icons is associated with a previously replaced contents of said associated non-overlapping resizeable pane;

said viewable display is a visual representation of a stack such that an earlier-replaced content visually appears below a later-replaced content; and selection of any of said view icons in a path to a top of said stack causes the contents of said associated non-overlapping resizeable pane to be replaced by the previously replaced contents associated with said selected view icon in a single operation.

7. The computer program product according to claim 6, wherein said window comprises a first window, said computer program product further comprising:

computer readable program code means for creating a second window having a workspace;

computer readable program code means for selecting one of said plurality of non-overlapping resizeable panes; and computer readable program code means associated with said computer readable program code means for creating a second window and said computer readable program code means for selecting for placing the contents which correspond to said selected one of said plurality of non-overlapping resizeable panes in said second window.

8. The computer program product according to claim 6, wherein said window comprises a first window, said computer program product further comprising:

computer readable program code means associated with said plurality of non-overlapping resizeable panes for selecting one of said plurality of non-overlapping resizeable panes;

computer readable program code means associated with said computer readable program code means for selecting for dragging said selected one of said plurality of non-overlapping resizeable panes to outside said first window; and computer readable program code means associated with said computer readable program code means for selecting and said computer readable program code means for dragging for creating a second window having a workspace the contents of which correspond to said selected and dragged one of said plurality of non-overlapping resizeable panes.

9. The computer program product according to claim 6, wherein resizing of one of said plurality of resizeable panes causes resizing of other of said resizeable panes.

10. The computer program product according to claim 6, wherein said plurality of resizeable panes contain related information and wherein selection of the selectable contents of said at least one of said plurality of resizeable panes causes contents of one other of said plurality of resizeable panes to be revised.

11. A method of providing a user interface for a data processing system, the method comprising the steps of:

providing a window having a workspace;

providing a plurality of non-overlapping resizeable panes within said workspace of said window;

providing selectable contents contained within at least one of said non-overlapping resizeable panes wherein said selectable contents include at least one option icon of user selectable options and wherein selecting said at least one option icon causes [the] contents of said at least one of said non-overlapping resizeable panes to be replaced by contents associated with said selected option icon; and providing a view stack associated with one of said non-overlapping resizeable panes the contents of which has been replaced, said view stack comprising a viewable display of one or more view icons, wherein:

each of said view icons is associated with a previously replaced contents of said associated non-overlapping resizeable pane;

said viewable display is a visual representation of a stack such that an earlier-replaced content visually appears below a later-replaced content; and selection of any of said view icons in a path to a top of said stack causes the contents of said associated non-overlapping resizeable pane to be replaced by the previously replaced contents associated with said selected view icon in a single operation.

12. The method according to claim 11, wherein said window comprises a first window, said method further comprising the steps of:

creating a second window having a workspace;

selecting one of said plurality of non-overlapping resizeable panes; and placing the contents which correspond to said selected one of said plurality of non-overlapping resizeable panes in said second window.

13. The method according to claim 11, wherein said window comprises a first window, said method further comprising the steps of:

selecting one of said plurality of non-overlapping resizeable panes;

obtaining user input indicating that said selected one of said plurality of non-overlapping resizeable panes has been dragged to outside said first window; and creating a second window having a workspace the contents of which correspond to said selected and dragged one of said plurality of non-overlapping resizeable panes.

14. The method according to claim 11, further comprising the step of:

obtaining user input to resize of one of said plurality of resizeable panes; then resizing other of said resizeable panes based on the obtained user input.

15. The method according to claim 11, wherein said plurality of resizeable panes contain related information, the method further comprising the steps of:

selecting of the selectable contents of said at least one of said plurality of resizeable panes; then revising the contents of one other of said plurality of resizeable panes based on said selection of the selectable contents.

* * * * *